United States Patent
Denny et al.

(10) Patent No.: US 11,110,393 B2
(45) Date of Patent: Sep. 7, 2021

(54) ENHANCED INJECTION OF MERCURY OXIDANTS

(71) Applicant: ECOLAB USA INC., St. Paul, MN (US)

(72) Inventors: Nicholas Ryan Denny, Glen Ellyn, IL (US); John V. Meier, Chicago, IL (US); Daniel Eugene Schwarz, Naperville, IL (US); Peter E. Reed, Plainfield, IL (US)

(73) Assignee: ECOLAB USA INC., St. Paul, MN (US)

( * ) Notice: Subject to any disclaimer, the term of this patent is extended or adjusted under 35 U.S.C. 154(b) by 258 days.

(21) Appl. No.: 16/026,360

(22) Filed: Jul. 3, 2018

(65) Prior Publication Data
US 2019/0009210 A1 Jan. 10, 2019

Related U.S. Application Data

(60) Provisional application No. 62/529,116, filed on Jul. 6, 2017.

(51) Int. Cl.
| | | |
|---|---|---|
| B01D 53/02 | (2006.01) | |
| B01D 53/64 | (2006.01) | |
| F23J 15/02 | (2006.01) | |
| F23J 15/04 | (2006.01) | |
| F23J 15/00 | (2006.01) | |
| B01D 53/14 | (2006.01) | |

(52) U.S. Cl.
CPC ............ *B01D 53/64* (2013.01); *F23J 15/003* (2013.01); *F23J 15/02* (2013.01); *F23J 15/04* (2013.01); *B01D 53/1481* (2013.01); *B01D 2251/106* (2013.01); *B01D 2251/108* (2013.01); *B01D 2251/1065* (2013.01); *B01D 2251/404* (2013.01); *B01D 2251/60* (2013.01); *B01D 2253/1128* (2013.01); *B01D 2257/2042* (2013.01); *B01D 2257/2045* (2013.01); *B01D 2257/2068* (2013.01); *B01D 2257/602* (2013.01); *B01D 2258/0283* (2013.01); *F23J 2215/60* (2013.01)

(58) Field of Classification Search
CPC ...... B01D 2251/106; B01D 2251/1065; B01D 2251/108; B01D 2251/404; B01D 2251/60; B01D 2253/1128; B01D 2257/2042; B01D 2257/2045; B01D 2257/2068; B01D 2257/602; B01D 2258/0283; B01D 53/1481; B01D 53/64; F23J 15/003; F23J 15/02; F23J 15/04; F23J 2215/60
See application file for complete search history.

(56) References Cited

U.S. PATENT DOCUMENTS

| | | |
|---|---|---|
| 4,107,271 A | 8/1978 | Atsukawa et al. |
| 5,494,588 A | 2/1996 | LaZonby |
| 5,658,467 A | 8/1997 | LaZonby et al. |
| 5,658,540 A | 8/1997 | Valentino |
| 5,733,786 A | 3/1998 | Green |
| 5,785,867 A | 7/1998 | LaZonby et al. |
| 5,980,758 A | 11/1999 | LaZonby et al. |
| 6,007,726 A | 12/1999 | Yang et al. |
| 6,123,870 A | 9/2000 | Yang et al. |
| 6,136,205 A | 10/2000 | Dallmier et al. |
| 6,156,229 A | 12/2000 | Yang et al. |
| 6,245,729 B1 | 6/2001 | Wei et al. |
| 6,270,722 B1 | 8/2001 | Yang et al. |
| 6,287,473 B1 | 9/2001 | Yang et al. |
| 6,319,888 B2 | 11/2001 | Wei et al. |
| 6,423,267 B1 | 7/2002 | Yang et al. |
| 6,669,904 B1 | 12/2003 | Yang et al. |
| 6,808,692 B2 | 10/2004 | Oehr |
| 6,942,840 B1 | 9/2005 | Broderick |
| 8,080,088 B1 | 12/2011 | Srinivasachar |
| 8,110,163 B2 | 2/2012 | Keiser et al. |
| 8,142,548 B2 | 3/2012 | Higgins et al. |
| 8,173,566 B2 | 5/2012 | Olson et al. |
| 8,309,046 B2 | 11/2012 | Pollack et al. |
| 8,679,430 B2 | 3/2014 | Pollack et al. |
| 8,729,296 B2 | 5/2014 | Fast et al. |
| 8,865,099 B1 | 10/2014 | Gray et al. |

(Continued)

FOREIGN PATENT DOCUMENTS

| | | |
|---|---|---|
| CL | 201100611 | 3/2011 |
| CL | 201100612 | 3/2011 |

(Continued)

OTHER PUBLICATIONS

International Search Report and Written Opinion for International Application No. PCT/US2016/047836, 13 pages, (dated Nov. 23, 2016).
International Search Report and Written Opinion for International Application No. PCT/US2016/047822, 12 pages, (dated Nov. 23, 2016).
International Search Report and Written Opinion for International Application No. PCT/US2016/047830, 13 pages. (dated Nov. 27, 2016).
International Search Report and Written Opinion for International Application No. PCT/US2018/040690, 17 pages. (dated Nov. 9, 2018).

(Continued)

*Primary Examiner* — Christopher P Jones
(74) *Attorney, Agent, or Firm* — Eric D. Babych; Barnes & Thornburg LLP

(57) ABSTRACT

The disclosure relates generally to reducing mercury emissions from a coal power plant. Specifically, a method for treating a gas stream containing mercury is provided that includes injecting a mercury oxidant or absorbent and a carrying agent into a gas stream that was produced by heating or burning a carbonaceous fuel comprising mercury. The carrying agent vaporizes after being injected into the gas stream. The mercury oxidant or absorbent and a carrying agent may be injected before passing the gas stream into a gas scrubber.

13 Claims, 6 Drawing Sheets

(56) References Cited

U.S. PATENT DOCUMENTS

| | | |
|---|---|---|
| 8,877,254 B2 | 11/2014 | Li et al. |
| 9,603,963 B2 | 3/2017 | Temple |
| 2002/0068030 A1 | 6/2002 | Nolan et al. |
| 2002/0102189 A1 | 8/2002 | Madden et al. |
| 2003/0143214 A1 | 7/2003 | Pellico et al. |
| 2003/0161771 A1 | 8/2003 | Oehr |
| 2003/0170159 A1 | 9/2003 | Honjo et al. |
| 2003/0200997 A1 | 10/2003 | Gill et al. |
| 2006/0021506 A1 | 2/2006 | Hakka et al. |
| 2006/0048646 A1 | 3/2006 | Olson et al. |
| 2006/0057044 A1* | 3/2006 | Chang .............. B01D 53/64 423/210 |
| 2006/0210463 A1 | 9/2006 | Comrie |
| 2007/0184394 A1 | 8/2007 | Comrie |
| 2010/0061909 A1 | 3/2010 | Kawamura et al. |
| 2011/0268637 A1 | 11/2011 | Ukai et al. |
| 2012/0090517 A1 | 4/2012 | Radway |
| 2012/0100053 A1 | 4/2012 | Durham et al. |
| 2012/0189520 A1 | 7/2012 | Pfeffer et al. |
| 2012/0285352 A1* | 11/2012 | Senior .............. C10L 9/10 110/342 |
| 2013/0034485 A1 | 2/2013 | Naito |
| 2013/0168293 A1 | 7/2013 | O'Rear et al. |
| 2013/0180923 A1 | 7/2013 | Keiser et al. |
| 2013/0224093 A1 | 8/2013 | Xiong et al. |
| 2013/0306521 A1 | 11/2013 | O'Rear et al. |
| 2013/0309157 A1 | 11/2013 | Sjostrom et al. |
| 2013/0330257 A1 | 12/2013 | Tramposch |
| 2014/0050641 A1* | 2/2014 | Ergang .............. B01D 53/80 423/210 |
| 2014/0079615 A1 | 3/2014 | Honjo et al. |
| 2014/0224121 A1 | 8/2014 | Mimna et al. |
| 2015/0068189 A1 | 3/2015 | Sawatsubashi et al. |
| 2015/0096480 A1 | 4/2015 | Comrie |
| 2015/0265967 A1 | 9/2015 | Butz et al. |
| 2015/0283500 A1 | 10/2015 | Butz et al. |
| 2016/0038871 A1* | 2/2016 | Li .............. B01J 20/3236 95/36 |
| 2016/0158701 A1 | 6/2016 | Brown et al. |
| 2017/0050144 A1 | 2/2017 | Kamiyama et al. |

FOREIGN PATENT DOCUMENTS

| | | |
|---|---|---|
| CL | 2012003022 A1 | 6/2013 |
| CL | 2013001404 A1 | 12/2013 |
| CL | 2013001683 A1 | 12/2013 |
| CL | 2013002717 A1 | 1/2014 |
| CL | 2013000923 A1 | 10/2014 |
| CL | 2018000417 A1 | 7/2018 |
| CL | 2018000419 A1 | 7/2018 |
| CN | 1864813 A | 11/2006 |
| CN | 1962034 A | 5/2007 |
| CO | 6620057 A2 | 2/2013 |
| JP | H05220345 A | 8/1993 |
| WO | WO 03/076051 A1 | 9/2003 |
| WO | WO 2007/149867 A1 | 12/2007 |
| WO | WO 2009/043108 A1 | 4/2009 |
| WO | WO 2009/052362 A2 | 4/2009 |
| WO | WO 2011/127323 A2 | 10/2011 |
| WO | WO 2013/188327 A1 | 12/2013 |
| WO | WO 2014/126749 A1 | 8/2014 |
| WO | WO 2017/034999 A1 | 3/2017 |
| WO | WO 2017/037454 A1 | 3/2017 |

OTHER PUBLICATIONS

Krzyżyńska, Renata, et al., "Absorption of NOx, SO2, and Mercury in a Simulated Additive-Enhanced Wet Flue Gas Desulphurization Scrubber," *Polish J. of Environ. Stud.*, 19(6):1255-1262 (2010).

Miller, Charles E., et al., "Mercury Capture and Fate Using Wet FGD at Coal-Fired Power Plants," *DOE/NETL Mercury and Wet FGD R&D*, pp. 1-37 (Aug. 2006).

Walsh, Jr., Williams A., et al., "Cost-effective retrofitting of fossil fueled power plants with pre-oxidation of raw flue gas to meet nitrogen oxides, sulfur oxides and mercury emission limits," *25th Annual International Pittsburgh Coal Conference, PCC—Proceedings*, 2008, ISBN-10: 189097725X, ISBN-13: 9781890977252, Abstract only (2008).

\* cited by examiner

ENHANCED INJECTION OF MERCURY OXIDANTS

BACKGROUND

1. Field of the Invention

The present disclosure generally relates to the reduction of mercury emissions into the environment from the combustion of coal and/or other carbon-based fuels as well as from other processing systems. More particularly, the disclosure pertains to oxidizing mercury in flue gases and capturing oxidized mercury in flue gas desulfurization systems or scrubbers, which enables the use of coal as a clean and environmentally friendlier fuel source.

2. Description of the Related Art

The demand for electricity continues to grow globally. In order to keep stride with the growing demand, coal continues to be a primary source for electricity generation. Generating electricity through burning of coal results in the production of solid waste such as bottom and fly ash, and flue gas emissions into the environment. Emissions Standards, as articulated in The Clean Air Act Amendments of 1990 as established by the U.S. Environmental Protection Agency (EPA), requires the assessment of hazardous air pollutants from utility power plants. The EPA established Mercury and Air Toxics Standards (MATS) that sets specific mercury emission standards for power plants. The goal of MATS is to prevent 90% of the mercury in coal burned in power plants from being emitted to the air.

Conventional coal-fired combustion furnaces and similar devices produce emissions that include pollutants such as mercury. Mercury vapor can contribute to health concerns. At the levels common in the atmosphere, the concentrations of mercury are usually safe; however, mercury accumulates in ecosystems, for example, as a result of rainfall. Some conventional systems attempt to control mercury emissions with particulate collection devices.

The primary gas emissions are criteria pollutants (e.g. sulfur dioxide, nitrogen dioxides, particulate material, and carbon monoxide). Secondary emissions depend on the type of coal or fuel being combusted but include as examples mercury, selenium, arsenic, and boron. Coal-fired utility boilers are known to be a major source of anthropogenic mercury emissions in the United States. In December of 2000, the EPA announced their intention to regulate mercury emissions from coal-fired utility boilers despite the fact that a proven best available technology (BAT) did not exist to capture or control the levels of mercury released by the combustion of coal. This has been further complicated by the lack of quick, reliable, continuous monitoring methods for mercury.

Mercury (elemental symbol Hg) is a metal that melts at 234K (−38° F.) and boils at 630K (674° F.). As such, it can be expected to have a high vapor pressure relative to many metals. The oxidized forms of mercury, $Hg^{2+}$ and $Hg^+$, have much lower vapor pressures, can be captured by fly ash particulates and are soluble in water.

Mercury is found in coals at concentrations ranging from 0.02 to 1 ppm. The mercury is present as sulfides, or associated with organic matter. Upon combustion, the mercury is released and emitted into the flue gas as gaseous elemental mercury and other mercury compounds. The mercury appears in the flue gas in both the solid and gas phases (particulate-bound mercury and vapor-phase mercury, respectively). The so-called solid phase mercury is really vapor-phase mercury adsorbed onto the surface of ash and/or carbon particles. The solid-phase mercury can be captured by existing particle control devices (PCDs) such as electrostatic precipitators (ESPs) and fabric filters (FF), the latter is sometimes referred to as baghouses.

Several control strategies have been developed for the control of mercury emissions from coal-fired boilers. Some of these methods include injection of activated carbon, modified activated carbon, various chemical catalysts, and inorganic sorbents. Unfortunately, none of these strategies removes all the mercury from the flue gas. The efficiencies range from as low as 30% to as high as 90% based on the amount of mercury entering the system with the coal. In addition, these technologies either produce unwanted effects on by-products such as impacting the quality of fly ash, or generate additional waste streams for the power plant leading to higher operational costs for the power plant. One promising strategy is to take advantage of existing air pollution control devices (APCDs) to augment or to serve as the primary means to remove vapor-phase mercury. Two examples of APCDs are semi-dry and wet scrubbers or Flue Gas Desulfurizer (FGD). Semi-dry FGDs are also known as spray dryer absorbers (SDAs), circulating dry scrubbers (CDS), or TURBBOSORP® available from Von Roll.

Sulfur oxides (SOx) regulatory compliance mandates the use of at least one of several control strategies. Three such strategies that are used in the US are sorbent injection into the flue gas following by a particulate collection device such as an ESP (electrostatic precipitator) or fabric filter, and wet or dry flue gas desulfurizers. At present about 3% of the coal-fired power plants are using sorbent injection. FGD scrubbing accounts for 85% using wet and 12% using dry scrubber technologies. Wet scrubbers achieve greater than 90% SOx removal efficiency compared to 80% by dry scrubbing. In wet scrubbers, the flue gas is brought into contact with slurry containing an alkaline source, such as lime or limestone. The SOx is adsorbed into the water and reacts to form calcium sulfate. It has been demonstrated that simultaneous to SOx capture, wet FGDs can be used to capture oxidized, vapor-phase mercury from the flue gas.

BRIEF SUMMARY

In some embodiments, a method of treating a gas stream containing mercury is disclosed. The method may include injecting a composition into the gas stream before passing the gas stream into a gas scrubber, wherein the composition includes an oxidant or absorbent and a carrying agent; and vaporizing the carrying agent in the composition after injecting the composition into the gas stream.

In some embodiments, the method may include injecting a pressurized gas and the composition through a nozzle.

In some embodiments, the method may include passing the gas stream into a wet flue gas desulfurizer.

In some embodiments, the method may include mixing acetic acid, a bromide salt, or iodide salt with the oxidant.

In some embodiments, the method may include burning a carbonaceous fuel comprising mercury, thereby producing the gas stream.

In some embodiments, the method may include adding a bromine salt or iodide salt to the carbonaceous fuel.

In some embodiments, the oxidant may include a halogen.

In some embodiments, the oxidant may be selected from hydrogen peroxide, sodium percarbonate, sodium perborate, hydrogen peroxide-urea, peroxyacid, organic peroxide, persulfate, sodium hypochlorite, potassium hypochlorite, calcium hypochlorite, and any combination thereof.

In some embodiments, the oxidant or absorbent may be selected from peracetic acid, hypochlorite, hypobromite, hypobromous acid, perbromic acid, bromous acid, hypoiodite, persulfate, chlorine dioxide, a mixture of hypochlorite, hypobromite, and hypoiodite, a mixture of hypochlorite and hypobromite, a mixture of hypochlorite and hypoiodite, a mixture of hypobromite and hypoiodite, copper sulfate, polysulfide, and a mixture of copper sulfate and polysulfide.

In some embodiments, the oxidant may be selected from hypobromite, hypobromous acid, perbromic acid, bromous acid, hypoiodite, and any combination thereof.

In some embodiments, the oxidant may be selected from hydrogen peroxide, persulfate, sodium hypochlorite, potassium hypochlorite, calcium hypochlorite, and any combination thereof.

In some embodiments, the composition may include a bromide salt and the oxidant may be selected from hydrogen peroxide, sodium percarbonate, sodium perborate, hydrogen peroxide-urea, peroxyacid, organic peroxide, persulfate, sodium hypochlorite, potassium hypochlorite, calcium hypochlorite, and any combination thereof.

In some embodiments, the composition may be injected into the gas stream after the gas stream has passed through a particulate control device. In other embodiments, the composition may be injected into the gas stream before passing the gas stream through a particulate control device. In certain embodiments, the composition may be injected into the gas stream before the gas stream enters a particulate control device and after the gas stream has passed through a particulate control device.

In some embodiments, the carrying agent is water.

In some embodiments, a weight ratio of the oxidant or absorbent to the mercury in the gas stream ranges from about 0.5:1 to about 20000000:1.

In other embodiments, a method of reducing mercury emissions in a flue gas is disclosed. The method may include injecting a composition into the flue gas before passing the flue gas into a flue gas scrubber, wherein the composition includes an oxidant and a carrying agent, and the flue gas includes mercury; and vaporizing the carrying agent in the composition after injecting the composition into the flue gas.

In some embodiments, the method may include injecting a pressurized gas and the composition through a nozzle.

In some embodiments, the method may include passing the flue gas into a wet flue gas desulfurizer.

In some embodiments, the oxidant may be selected from hydrogen peroxide, sodium hypochlorite, potassium hypochlorite, calcium hypochlorite, persulfate, and any combination thereof.

In some embodiments, the oxidant may be selected from peracetic acid, hypochlorite, bromine, hypobromite, hypobromous acid, perbromic acid, bromous acid, hypoiodite, sodium percarbonate, sodium perborate, hydrogen peroxide-urea, peroxyacid, organic peroxide, persulfate, and any combination thereof.

In some embodiments, the oxidant may be selected from bromine, hypobromite, hypobromous acid, perbromic acid, bromous acid, hypoiodite, and a mixture of hypobromite and hypoiodite.

In some embodiments, the oxidant may be hypobromite.

In some embodiments, the composition may include a bromide salt and persulfate.

In some embodiments, a method of reducing mercury emissions is disclosed. The method may include burning a carbonaceous fuel that includes mercury, thereby producing a flue gas; and injecting a composition into the flue gas before passing the flue gas into a flue gas scrubber, wherein the composition includes an oxidant and water, and the composition is injected into the flue gas as a mist comprising water droplets that vaporize.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE DRAWINGS

A detailed description of the invention is hereafter described with specific reference being made to the drawings in which.

DETAILED DESCRIPTION

Figure 1:
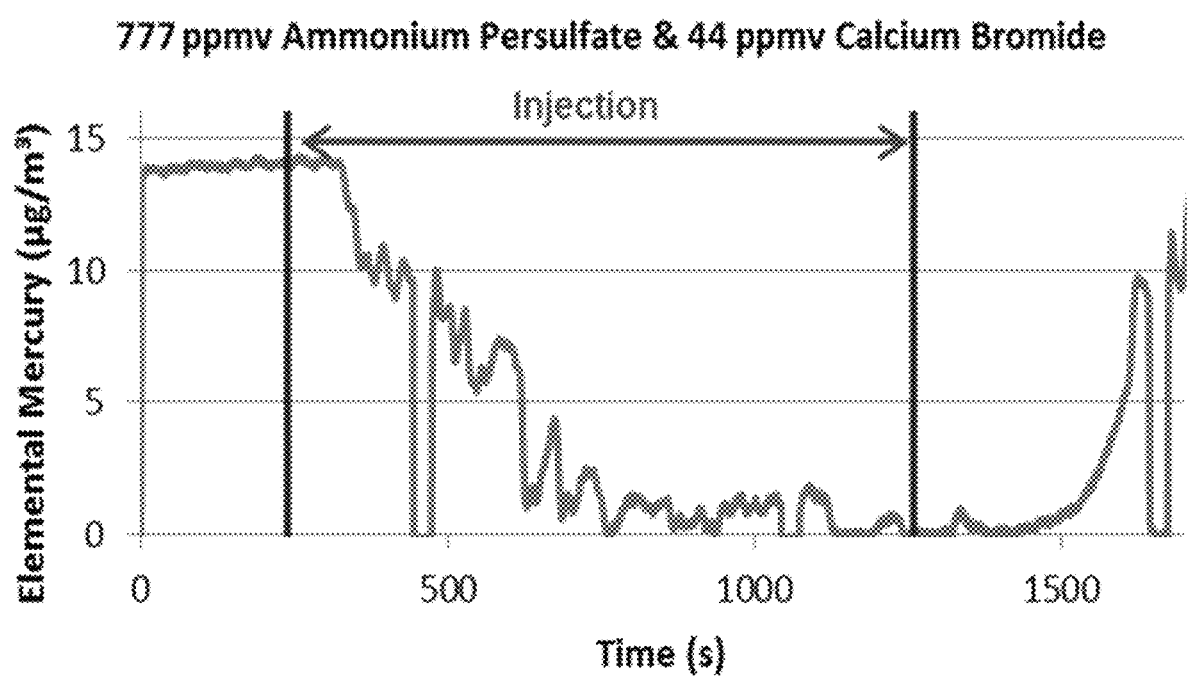
FIG. 1 shows elemental mercury concentration in a gas stream treated with ammonium persulfate and calcium bromide ($CaBr_2$)

Various embodiments are described below. The relationship and functioning of the various elements of the embodiments may better be understood by reference to the following detailed description. However, embodiments are not limited to those illustrated below. In certain instances, details may have been omitted that are not necessary for an understanding of embodiments disclosed herein.

Elemental mercury is water insoluble and is not removed by a wet FGD. In contrast, oxidized mercury in the flue gas is water-soluble and can be removed by a wet FGD. Hence, one strategy for mercury capture is to oxidize mercury in the flue gas after burning the coal and capturing the oxidized mercury in the wet scrubber.

Often, the recovery of desirable ore products involves refining the ore from materials that contain mercury. For example, phosphate is often extracted from phosphorite which contains mercury as a trace element. During refinement of the desirable phosphorous mineral, mercury can be liberated such during fertilizer manufacture. In such cases, the mercury passes into a scrubber fluid, for example a sodium-based alkali that is used to capture sulfur dioxide ($SO_2$). The mercury can be removed using the processes described herein.

As another example, gold ore processing often involves roasting the gold ore to oxidize and remove sulfide. The gas generated by sulfur burning in the roaster is scrubbed to remove the sulfur dioxide and other components which can be contaminated with mercury. Mercury can be removed from these off gasses to make the gold processing more environmentally desirable.

Thus, techniques described herein can be used to remove contaminating amounts of mercury from off-gasses arising from various ore processing and ore refineries processing those ores.

Oxidants can be added directly to the wet FGD to oxidize and capture elemental mercury; however, the wet FGD consumes large amounts of oxidant. To meet the oxidant demand in the wet FGD, a significant amount of oxidant was required to oxidize the mercury. The present disclosure provides an improved method for removing mercury from a gas stream through enhanced injection of oxidants or absorbents; thereby reducing the amount of oxidant required in the wet FGD.

Injecting oxidative compositions directly into flue gas before a wet FGD can result in undesirable corrosion of the duct work carrying the flue gas. This disclosure provides methods for injecting compositions containing oxidants into the flue gas while avoiding corrosion of the duct work. As used herein, "injecting" or "inject" includes adding, introducing, or mixing.

In some embodiments, a method is provided for treating a gas stream containing mercury. The method may include heating a carbonaceous fuel. The method may include burning the carbonaceous fuel. As mentioned above the carbonaceous fuel may include trace amounts of mercury. The heating or the burning of the carbonaceous fuel may produce a gas stream that contains mercury. Generally, the gas stream contains three categories of mercury: elemental mercury, oxidized mercury, and particulate mercury. Particulate mercury can be removed from the flue gas using a fabric filter, for example. Oxidized mercury can be removed from the gas stream using a scrubber, such as a wet FGD. The method may include injecting a composition into the gas stream before passing the gas stream into a flue gas scrubber. The composition may include an oxidant or absorbent and a carrying agent. The method may also include vaporizing the carrying agent in the composition after injecting the composition into the gas stream.

In some embodiments, the oxidant or absorbent may be selected from peracetic acid, hypochlorite, bromine, hypobromite, hypobromous acid, perbromic acid, bromous acid, chlorine dioxide, any combination of the foregoing, copper sulfate, polysulfide, and a mixture of copper sulfate and polysulfide.

In some embodiments, the oxidant may include a halogen, such as but not limited to chlorine, bromine, or iodine.

In some embodiments, the oxidant may be selected from peracetic acid, hypochlorite, bromine, hypobromite, hypobromous acid, perbromic acid, bromous acid, hypoiodite, and any combination thereof.

In some embodiments, the oxidant may be selected from hypochlorite, bromine, hypobromite, hypobromous acid, perbromic acid, bromous acid, hypoiodite, and any combination thereof.

In some embodiments, the oxidant may be selected from hypochlorite, bromine, hypobromite, hypobromous acid, perbromic acid, bromous acid, and hypoiodite.

In some embodiments, the oxidant may be selected from bromine, hypobromite, hypobromous acid, perbromic acid, bromous acid, and any combination thereof.

In some embodiments, the oxidant may be hypobromite.

In other embodiments, the oxidant may be hypobromous acid.

In some embodiments, the oxidant may be perbromic acid.

In certain embodiments, the oxidant may be persulfate.

In some embodiments, the composition may consist of an oxidant and a carrying agent. In other embodiments, the composition may consist of an oxidant, a bromide salt, and a carrying agent. In some embodiments, the composition may consist of peracetic acid and a carrying agent. In some embodiments, the composition may consist of hypochlorite and a carrying agent. In some embodiments, the composition may consist of hypobromite and a carrying agent. In some embodiments, the composition may consist of hypoiodite and a carrying agent. In some embodiments, the composition may consist of copper sulfate, polysulfide, and a carrying agent.

Peracetic acid can be prepared by mixing acetic acid with an oxidant. Suitable oxidants include but are not limited to hydrogen peroxide, sodium hypochlorite, potassium hypochlorite, calcium hypochlorite or mixtures of the same. In some embodiments, the oxidant is hydrogen peroxide.

Hypobromite can be prepared by mixing a bromine salt with an oxidant. In some embodiments, the bromine salt may be $CaBr_2$, sodium bromide (NaBr), or other bromine salts or as a mixture of various bromine salts. One of skill in the art would also understand that salts of bromide refer to bromide ions, typically seen as $Br^-$, but which can also exist in a different oxidation state. The oxidant source may be any oxidant that converts a bromide ion ($Br^-$) to hypobromite ($Br-O^-$) such as hypochlorite, e.g. sodium hypochlorite.

Hypoiodite can be prepared by mixing an iodine salt with an oxidant, such as hypochlorite. In some embodiments, the iodine salt may be potassium iodide. The iodine salt may be in the form of calcium iodide ($CaI_2$), sodium iodide (NaI), or other iodine salts or as a mixture of various iodine salts. Hypoiodite is formed by adding an oxidant to the stream containing the iodine salt to generate hypoiodite in situ. In some embodiments, the oxidant may be sodium hypochlorite, potassium hypochlorite, calcium hypochlorite, or any combination thereof.

One of skill in the art would also understand that salts of iodine refer to iodine ions, typically seen as $I^-$, but which can also exist in a different oxidation state. Hypoiodite is an ion known as $IO^-$ which is oxidized more than the iodide ion.

In some embodiments, the absorbent may be a compound having a formula of $(SiO_2)_x(OH)_yM_zS_aF$, where $SiO_2$ is an optional component. M comprises at least one of the following metal or metalloid cations: boron, magnesium, aluminum, calcium, titanium, vanadium, manganese, iron, cobalt, nickel, copper, zinc, zirconium, molybdenum, palladium, silver, cadmium, tin, platinum, gold, and bismuth. S comprises a sulfur-based species selected from at least one of the following: sulfide salts, dithiocarbamates, and polymer-based dithiocarbamates, polysulfide salts. It should be appreciated that M may comprise at least one of the recited metals, at least one of the recited metalloid cations, or a combination of both. In some embodiments, S consists of at least one such sulfur-based species. F is an optional component and comprises at least one of the following: a functionalized organosilane, a sulfur-containing organosilane, an amine-containing organosilane, and an alkyl-containing organosilane at a surface area coverage of about 0.01 to about 100%. In some embodiments, F consists of at least one such organosilane. It should be appreciated that surface area coverage of F refers to covering with F up to 100% of the remaining surface (i.e., using all of the silanol surface groups to attach an organosilane) that is available in the presence of the M component. In embodiments where $SiO_2$ is present, the molar ratio of y/x is equal to about 0.01 to about 0.5 and the molar ratio of x/z is equal to about 0.1 to about 300. In embodiments where $SiO_2$ is not present, y is 0 and Z is 1. The molar ratio of a/z is about 0.5 to about 5.

In some embodiments, the absorbent is a compound having a formula of: $(SiO_2)_{15}(OH)_y \cdot Cu_1S_5$ wherein y is the relative surface concentration of hydroxyl species as determined by the residual moisture content. In some embodiments, the absorbent may be a mixture of copper sulfate and polysulfide. In some embodiments, the absorbent may be polysulfide salt. Polysulfide salts include but are not limited to sodium polysulfide, ammonium polysulfide, potassium polysulfide, and calcium polysulfide. In some embodiments, the absorbent comprises about 0.1% to about 15% by weight in the carrying agent.

In some embodiments, the method may include adding a bromine salt or iodide salt to the carbonaceous fuel. An oxidant may be injected into the gas stream that already contains bromine or iodide salt.

In some embodiments, bromide or iodide salts are added further upstream from where the composition is injected. For example, hypobromite may be formed in situ by adding an oxidant to the stream containing the bromide salt to generate hypobromite. The oxidant may be added to the scrubber liquor, low solids liquor return, virgin liquor, dispersion water, other liquid existing during the capture, recovery, and treatment process.

In certain embodiments, the composition may include an oxidant and a bromide or iodide salt. The oxidant may be persulfate, hydrogen peroxide, sodium percarbonate, sodium perborate, hydrogen peroxide-urea, peroxyacid, organic peroxide, sodium hypochlorite, potassium hypochlorite, calcium hypochlorite, or any combination thereof.

In some embodiments, the oxidant may be persulfate. Examples of persulfate include but are not limited to peroxydisulfate, peroxydisulfuric acid, peroxymonosulfate, and peroxymonosulfuric acid. Any salt of persulfate can be used, for example, potassium, sodium, and ammonium.

In some embodiments, the oxidant may be hypochlorite or any salt thereof. As used herein "hypochlorite" includes salts of hypochlorous acid, such as, but are not limited to, sodium hypochlorite and potassium hypochlorite.

In some embodiments, the oxidant may be peroxymonosulfate.

In some embodiments, the oxidant may be chlorine dioxide.

In some embodiments, the carrying agent may be water.

In some embodiments, the method may include mixing acetic acid, a bromide salt, or iodide salt with an oxidant.

In some embodiments, the oxidant may be persulfate, hydrogen peroxide, sodium hypochlorite, potassium hypochlorite, calcium hypochlorite, or any combination thereof.

In some embodiments, the oxidant comprises a peroxide. The peroxide may be selected from hydrogen peroxide, sodium percarbonate, sodium perborate, hydrogen peroxide-urea, peroxyacids, organic peroxides (such as tert-butyl hydroperoxide), and any combination thereof.

Certain compounds or method steps may be excluded from the method disclosed herein. In some embodiments, the composition may exclude nitrogen containing compounds, such as ammonia. In some embodiments, the composition may exclude adsorbents. The adsorbent may be activated carbon. In some embodiments, the composition injected into the flue gas stream may be free from nitrogen containing compounds and/or adsorbents. In some embodiments, the composition is not heated or passed through a heating device before injection into the flue gas or gas stream.

In some embodiments, a weight ratio of the mercury oxidant to the mercury in the gas stream ranges from about 0.5:1 to about 20000000:1.

Typically, the peracetic acid is applied at a ratio of about 0.5:1 to about 20000000:1 weight peracetic acid to weight of mercury being captured. In some embodiments, the ratio is from about 1:1 to about 2000000:1 and in some embodiments, the ratio is from about 5:1 to about 200000:1.

Typically, the hypobromite is applied at a ratio of about 0.5:1 to about 20000000:1 weight hypobromite to weight of mercury being captured. The ratio may be from about 1:1 to about 2000000:1 or from about 5:1 to about 200000:1.

Typically, the hypochlorite is applied at a ratio of about 0.5:1 to about 20000000:1 weight hypobromite to weight of mercury being captured. The ratio may be from about 1:1 to about 2000000:1 or from about 5:1 to about 200000:1.

Typically, the hypoiodite is applied at a ratio of about 0.5:1 to about 20000000:1 weight hypoiodite to weight of mercury being captured. The ratio may be from about 1:1 to about 2000000:1 or from about 5:1 to about 200000:1.

In some embodiments, the method may include injecting a pressurized gas and the composition through a nozzle or a plurality of nozzles. In some embodiments, the number of nozzles may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more.

In certain embodiments, an oxidant may be injected into the gas stream through a first nozzle or first set of nozzles and an absorbent may be injected through a second nozzle or second set of nozzles. The oxidant and adsorbent do not necessarily need to be injected at the same time, but can be added sequentially or simultaneously to the gas stream. For example, peracetic acid may be injected through a nozzle and copper sulfide may be injected through a different nozzle.

In other embodiments, different oxidants may be injected into the flue gas through the same or different nozzles. For example, hypochlorite may be injected through a first nozzle, hypobromite may be injected through a second nozzle, and persulfate may be injected through a third nozzle.

The nozzle may be an atomizing nozzle. The nozzle may atomize all or substantially all the liquid fed through the nozzle. The atomizing nozzle may be a two-fluid or dual-flow nozzle where pressurized liquid and pressurized air are fed through the nozzle to create fine droplets of liquid. The atomizing nozzle may include a body, a chamber, a liquid feed tube, a tangential gas feed tube, and a nozzle. The nozzle frame is connected, e.g. welded, to the pipe carrying the gas stream. The chamber has a base and an outlet. The liquid feed tube has a tapered section for efficiently dropping the pressure and increasing the velocity of the liquid, such as water, introduced into the liquid feed tube from a high pressure liquid source. Moreover, the liquid feed tube is centrally aligned and extends a length longitudinally within the chamber. The liquid introduced into the liquid feed tube exits the tube at the discharge plane. The tangential gas feed tube also has a tapered section for efficiently lowering the pressure and increasing the velocity of the gas introduced into the tangential gas feed tube from a high pressure gas source. The gas introduced into the tangential gas feed tube exits the tube at the gas exit surface. The gas from the tangential gas feed tube is discharged above the portion of the liquid feed tube projecting into the chamber so that it fully encircles the projecting portion of the liquid feed tube. If the gas was, for example, discharged at a point directly above the discharge point of the liquid, then it may deflect the course of the liquid and hinder the proper operation of the nozzle. The nozzle may be a two-fluid atomizing nozzle as described in U.S. Pat. No. 6,142,388, which is incorporated by reference. The nozzles of the present disclosure can be purchased from commercial suppliers, such as Enviro-Care International.

The composition may be fed to the nozzle at a flow rate ranging from about 1 gallon per minute to about 50 gallons per minute. In some embodiments, the composition may be fed to the nozzle at a flow rate ranging from about 1 gallon per minute to about 20 gallons per minute, from about 2 gallons per minute to about 20 gallons per minute, from about 3 gallons per minute to about 20 gallons per minute, from about 5 gallons per minute to about 15 gallons per minute, from about 10 gallons per minute to about 20 gallons per minute, or from about 10 gallons per minute to about 50 gallons per minute. In some embodiments, the flow rate of the composition may be about 12 gallons per minute. The composition may be fed at a pressure ranging from about 20 psi to about 150 psi. In some embodiments, the composition may be fed at a pressure of about 100 psi. The flow rate of the composition can be outside this range depending on the size of the system and the amount of flue gas to be treated.

In some embodiments, the pressurized gas may be fed to the nozzle at a flow rate of about 80 standard cubic feet per minute (scfm) to about 500 scfm. In some embodiments, the pressurized gas may be fed to the nozzle at a flow rate of about 100 scfm to about 400 scfm, about 150 scfm to about 350 scfm, or about 200 scfm to about 300 scfm. The pressurized gas may have a pressure ranging from about 20 psi to about 200 psi. In some embodiments, the pressurized gas may have a pressure ranging from about 50 psi to about 100 psi or about 70 psi to about 90 psi. In some embodiments, the pressurized gas may have a pressure of about 80 psi.

When the composition is injected through the nozzle, liquid droplets of the composition enters the gas stream. The liquid in the droplets quickly vaporizes before depositing on the inside of the pipe or ductwork.

In some embodiments, the mercury oxidant or absorbent may have a residence time in the pipe or ductwork of about 1 to 2 seconds before entering the scrubber. The residence time can be from about 1 second to about 10 seconds or from about 1 second to about 5 seconds. In some embodiments, the composition may be injected into the gas stream immediately after the gas stream exits a PCD.

In some embodiments, the composition may be injected into the gas stream after the gas stream has passed through a PCD. The PCD may be an ESP or a FF that removes particles from the gas.

In some embodiments, a method is provided for reducing mercury emissions in a flue gas. The method may include injecting a composition into the flue gas before passing the flue gas into a flue gas scrubber. The composition may include a mercury oxidant and a carrying agent, and the flue gas may include mercury. The method may include vaporizing the carrying agent in the composition after injecting the composition into the flue gas.

In some embodiments, a method is provided for reducing mercury emissions. The method may include burning a carbonaceous fuel that has trace amounts of mercury, thereby producing a flue gas. The method may include injecting a composition into the flue gas before passing the flue gas into a flue gas scrubber. The composition may include a mercury oxidant and water. The composition may be injected into the flue gas as a mist. The mist may include water droplets that vaporize.

After the composition is injected into the gas stream, the gas stream may be passed into a scrubber. The scrubbers currently used in the industry include spray towers, jet bubblers, and co-current packed towers as examples. These types of APCDs are provided as examples and are not meant to represent or suggest any limitation. Semi-dry FGDs can also be used, including SDAs, CDS or TURBBOSORP® available from Von Roll. In some embodiments, the gas stream or flue gas may be passed into a wet flue gas desulfurizer.

Mercury concentration in a scrubber liquor can be used to monitor wet FGD operations, and the rate of addition of mercury re-emission control additive can be adjusted accordingly to adjust mercury capture. In certain embodiments, the rate of addition of mercury re-emission control additive can be increased to compensate for higher concentrations of ionic mercury in the scrubber liquor, thereby reducing mercury re-emission. In certain embodiments, the rate of addition of the composition can be decreased to compensate for lower concentrations of ionic mercury in the scrubber liquor, thereby reducing excessive use of mercury oxidant or absorbent.

The percent mercury re-emission may be reduced to about 20% or less, about 19% or less, about 18% or less, about 17% or less, about 16% or less, about 15% or less, about 14% or less, about 13% or less, about 12% or less, about 11% or less, about 10% or less, about 9% or less, about 8% or less, about 7% or less, about 6% or less, about 5% or less, about 4% or less, about 3% or less, about 2% or less, about 1% or less, or 0%. In certain embodiments, at ionic mercury concentration levels less than about 200 parts per trillion (ppt), mercury re-emission may be reduced to zero or near zero.

EXAMPLES

Varying oxidants where added to a gaseous stream traveling through a quartz tube inside a 150° C. tube furnace to approximate conditions in and addition to a flue gas. The gaseous stream was comprised of about 10-20 μg/m³ elemental mercury, about 600 ppm $SO_2$ and the balance $N_2$ at a flow rate of about 2.3 L/min. The compositions were added at a rate of about 0.4 mL/min in carrier water to approximate the carrier water in the two-fluid atomizing nozzle. The droplets landed on the glass beads inside the furnace to disperse the oxidant into the gas stream. Elemental mercury was monitored in real time through continuous mercury monitors. Dips every ten minutes in elemental mercury to about 0 and back up after about 30 seconds are for the internal zero for the mercury monitor. Oxidized mercury and sulfur species in the gaseous phase were removed from the system using a sodium hydroxide impinger to scrub the gas.

Figure 2:
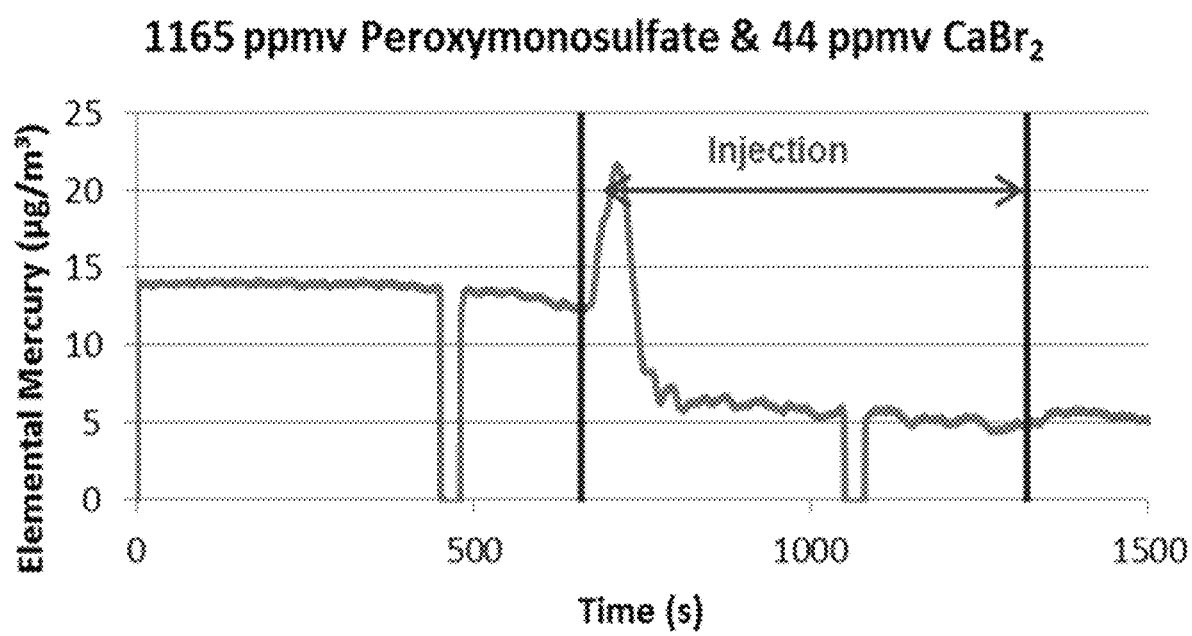
FIG. 2 shows elemental mercury concentration in a gas stream treated with peroxymonosulfate and $CaBr_2$.
Figure 3:
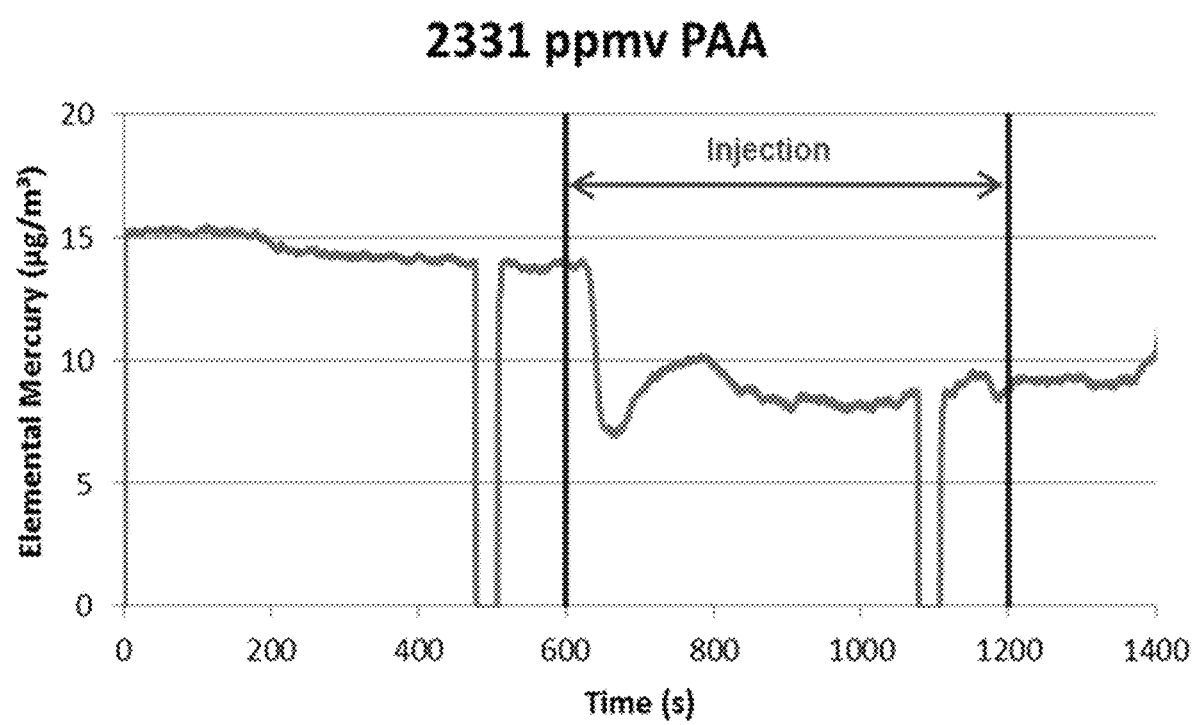
FIG. 3 shows elemental mercury concentration in a gas stream treated with peracetic acid (PAA)
Figure 4:
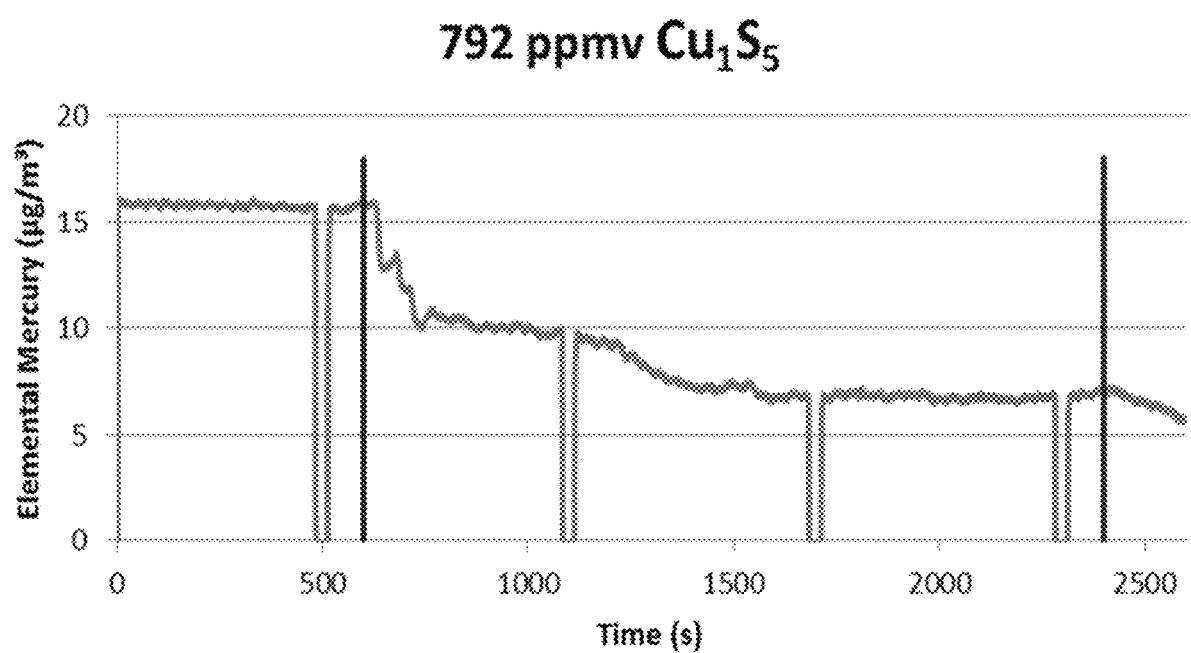
FIG. 4 shows elemental mercury concentration in a gas stream treated with copper sulfate.
Figure 5:
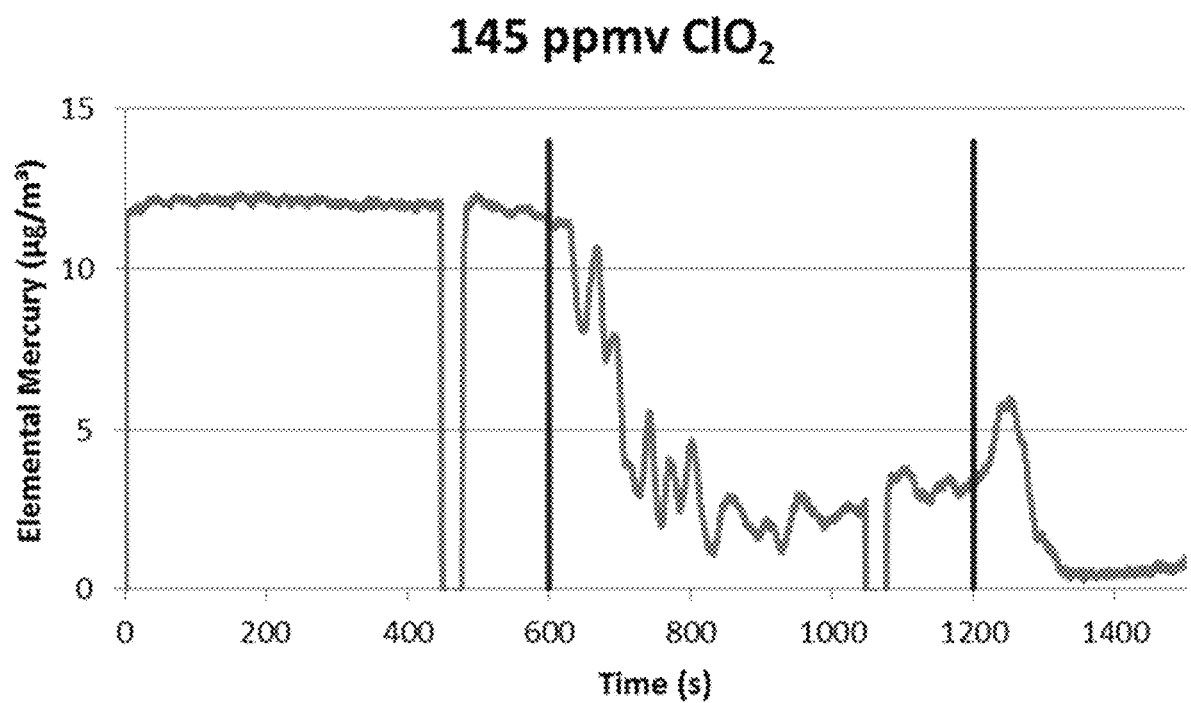
FIG. 5 shows elemental mercury concentration in a gas stream treated with chlorine dioxide.
Figure 6:
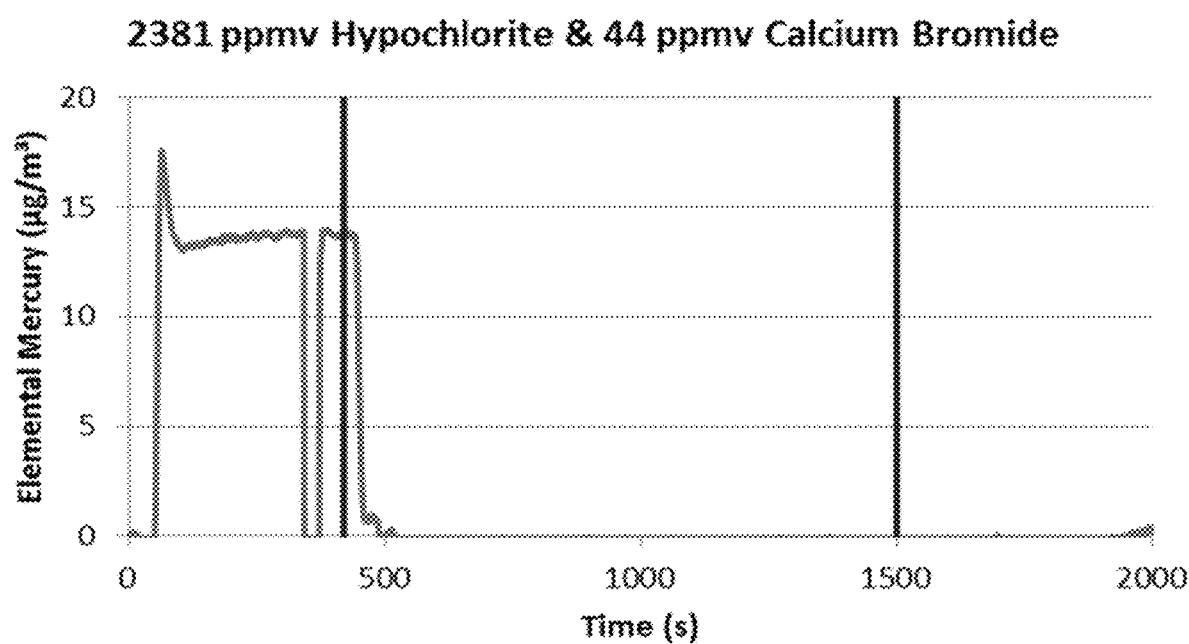
FIG. 6 shows elemental mercury concentration in a gas stream treated with hypochlorite and $CaBr_2$.

FIG. 1-6 show the concentration of elemental mercury in a gaseous stream treated with different compositions. The concentration of components in the composition was reported in units of parts per million by volume (ppmv). The vertical lines in each figure indicate when the compositions were continuously injected into the gas stream. FIG. 2 shows a peak at 709 s soon after injection commenced, which can be attributed to water addition in the sample line.

As used herein, the term "about" refers to the cited value being within the errors arising from the standard deviation found in their respective testing measurements, and if those errors cannot be determined, then "about" refers to within 10% of the cited value.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A method of treating a gas stream containing mercury, comprising:
    injecting a composition into the gas stream before passing the gas stream into a gas scrubber, wherein the composition consists of an absorbent and a carrying agent; and
    vaporizing the carrying agent in the composition after injecting the composition into the gas stream;
    wherein the absorbent is selected from the group consisting of copper sulfate, polysulfide, and a mixture of copper sulfate and polysulfide; and
    wherein the absorbent does not comprise a halogen oxidant or silica.

2. The method of claim 1, wherein the polysulfide is selected from sodium polysulfide, ammonium polysulfide, potassium polysulfide, calcium polysulfide, and any combination thereof.

3. The method of claim 2, further comprising injecting a pressurized gas and the composition through a nozzle.

4. The method of claim 2, further comprising passing the gas stream into a wet flue gas desulfurizer.

5. The method of claim 2, wherein the carrying agent is water.

6. The method of claim 2, wherein the absorbent comprises about 0.1% to about 15% by weight in the carrying agent.

7. The method of claim 2, wherein the composition is injected into the gas stream after the gas stream has passed through a particulate control device.

8. The method of claim 2, wherein a weight ratio of the absorbent to the mercury in the gas stream ranges from about 0.5:1 to about 20,000,000:1.

9. The method of claim 2, further comprising burning a carbonaceous fuel comprising mercury, thereby producing the gas stream.

10. A method of reducing mercury emissions in a flue gas, comprising:
    injecting a composition into the flue gas before passing the flue gas into a flue gas scrubber, wherein the composition consists of an absorbent and a carrying agent, and the flue gas comprises mercury; and
    vaporizing the carrying agent in the composition after injecting the composition into the flue gas;
    wherein the absorbent is selected from the group consisting of copper sulfate, polysulfide, and a mixture of copper sulfate and polysulfide; and
    wherein the absorbent does not comprise a halogen oxidant or silica.

11. The method of claim 10, wherein the polysulfide is selected from sodium polysulfide, ammonium polysulfide, potassium polysulfide, calcium polysulfide, and any combination thereof.

12. The method of claim 10, further comprising injecting a pressurized gas and the composition through a nozzle, and passing the flue gas into a wet flue gas desulfurizer.

13. A method of reducing mercury emissions, comprising:
    burning a carbonaceous fuel comprising mercury; thereby producing a flue gas; and
    injecting a composition into the flue gas before passing the flue gas into a flue gas scrubber, wherein the composition consists of an absorbent and water, and the composition is injected into the flue gas as a mist comprising water droplets that vaporize;
    wherein the absorbent is selected from the group consisting of copper sulfate, polysulfide, and a mixture of copper sulfate and polysulfide; and
    wherein the absorbent does not comprise a halogen oxidant or silica.

* * * * *